(12) United States Patent
Ao et al.

(10) Patent No.: US 11,168,667 B2
(45) Date of Patent: Nov. 9, 2021

(54) METHOD AND DEVICE FOR CALCULATING POWER GENERATION OF WIND FARM

(71) Applicant: XINJIANG GOLDWIND SCIENCE & TECHNOLOGY CO., LTD., Xinjiang (CN)

(72) Inventors: Juan Ao, Beijing (CN); Zhao Liu, Beijing (CN)

(73) Assignee: XINJIANG GOLDWIND SCIENCE & TECHNOLOGY CO., LTD., Xinjiang (CN)

( * ) Notice: Subject to any disclaimer, the term of this patent is extended or adjusted under 35 U.S.C. 154(b) by 583 days.

(21) Appl. No.: 15/776,294

(22) PCT Filed: Nov. 6, 2017

(86) PCT No.: PCT/CN2017/109513
§ 371 (c)(1),
(2) Date: May 15, 2018

(87) PCT Pub. No.: WO2018/161626
PCT Pub. Date: Sep. 13, 2018

(65) Prior Publication Data
US 2019/0338758 A1   Nov. 7, 2019

(30) Foreign Application Priority Data
Mar. 6, 2017 (CN) .......................... 201710127574.9

(51) Int. Cl.
*G06F 30/20* (2020.01)
*F03D 17/00* (2016.01)
(Continued)

(52) U.S. Cl.
CPC ............. *F03D 17/00* (2016.05); *G06F 30/20* (2020.01); *G06Q 50/06* (2013.01);
(Continued)

(58) Field of Classification Search
CPC .......... G01W 1/00; G01W 1/10; G01S 7/497; G06F 2111/10; G06F 2113/06;
(Continued)

(56) References Cited

U.S. PATENT DOCUMENTS 8,930,299 B2 * 1/2015 Pyle ........................ G01W 1/10
706/52
9,274,250 B2 * 3/2016 Pasken ..................... G01W 1/00
(Continued)

FOREIGN PATENT DOCUMENTS

CN    103514341 A    1/2014
CN    104091209 A    10/2014
(Continued)

OTHER PUBLICATIONS

F. Castellani, D. Astolfi, M. Burlando, and L. Terzi, "Numerical Modelling for wind farm operational assessment in complex terrain" pp. 320-329, Elsevier (Year: 2015).*
(Continued)

*Primary Examiner* — Kibrom K Gebresilassie (57) ABSTRACT

A method and a device for calculating a power generation of a wind farm is provided. The method includes: determining whether a terrain complexity of a wind farm field exceeds a predetermined complexity; determining a representativeness of anemometer tower data in the wind farm field in a case where the terrain complexity exceeds the predetermined complexity; performing a mesoscale numerical simulation of a meteorological variable in the wind farm field in a case where the anemometer tower data is unrepresentative; extracting mesoscale numerical simulation data as virtual anemometer tower data; and calculating the power generation of the wind farm by using the virtual anemometer tower data.

19 Claims, 3 Drawing Sheets

(51) Int. Cl.
*G06Q 50/06* (2012.01)
*G01W 1/00* (2006.01)
*G06F 111/10* (2020.01)
*G06F 113/06* (2020.01)

(52) U.S. Cl.
CPC ....... *F05B 2260/84* (2013.01); *F05B 2270/32* (2013.01); *F05B 2270/335* (2013.01); *G01W 1/00* (2013.01); *G06F 2111/10* (2020.01); *G06F 2113/06* (2020.01)

(58) Field of Classification Search
CPC .. G06F 30/20; F05B 2260/84; F05B 2270/32; F05B 2270/335
See application file for complete search history.

(56) References Cited

U.S. PATENT DOCUMENTS

| | | | | |
|---|---|---|---|---|
| 9,599,096 | B2* | 3/2017 | Spruce | F03D 7/028 |
| 10,778,010 | B2* | 9/2020 | Caliao | H02J 3/386 |
| 2012/0046917 | A1* | 2/2012 | Fang | G01W 1/10 703/1 |
| 2012/0050750 | A1* | 3/2012 | Hays | G01S 17/003 356/519 |
| 2012/0185414 | A1 | 7/2012 | Pyle et al. | |
| 2012/0303278 | A1* | 11/2012 | Dannevik | G01W 1/00 702/3 |
| 2014/0324351 | A1* | 10/2014 | Dannevik | G01W 1/00 702/3 |
| 2014/0344209 | A1* | 11/2014 | Fang | G06N 7/005 706/52 |
| 2015/0039228 | A1* | 2/2015 | Wang | G01W 1/00 702/3 |
| 2016/0076518 | A1* | 3/2016 | Vitale | F03D 9/25 290/44 |
| 2016/0223600 | A1* | 8/2016 | Wang | G01R 21/133 |
| 2018/0223814 | A1* | 8/2018 | Badrinath Krishna | G06N 3/084 |
| 2018/0274520 | A1* | 9/2018 | Wang | G01P 5/26 |
| 2019/0228362 | A1* | 7/2019 | Anagnostou | G06N 20/00 |
| 2019/0338758 | A1* | 11/2019 | Ao | G06Q 50/06 |
| 2019/0362070 | A1* | 11/2019 | Abbaszadeh | G06F 21/55 |

FOREIGN PATENT DOCUMENTS

| | | |
|---|---|---|
| CN | 104361616 A | 2/2015 |
| CN | 104699936 A | 6/2015 |
| CN | 104794259 A | 7/2015 |
| CN | 105279576 A | 1/2016 |
| CN | 105512766 A | 4/2016 |
| CN | 105911467 A | 8/2016 |
| CN | 106250656 A | 12/2016 |
| CN | 106407566 A | 2/2017 |
| JP | 2011-258170 A | 12/2011 |

OTHER PUBLICATIONS

D. Carvalho, et al; "Wind resource modelling in complex terrain using different mesoscale-microscale coupling techniques", Applied Energy, vol. 108; pp. 493-504; Available online Apr. 19, 2013.

Yanying Fang; "Experimental study on numerical simulation of wind energy resources based on the combination of WRF and CFD model", Proceedings of the ninth Yangtze river delta meteorological science and technology forum, Dec. 31, 2012, pp. 1-7.

Stephen Rose, et al; "Generating wind time series as a hybrid of measured and simulated data", Wind Energ. 2012; vol. 15, pp. 699-715; Published online Oct. 3, 2011 in Wiley Online Library.

Rui Wang; "Study on the representative determination method of wind tower in wind farm with complex terrain", Wind Energy, vol. 7, Jul. 6, 2015; pp. 66-69.

Youtube; "WindSim Power Forecasting Part1 Strategies", https://www.youtube.com/watch?v=a5UcmKDdJGE, Windsim AS, Jan. 2017.

The partial supplementary European Search Report dated Jan. 29, 2020; Appln. No. 17868504.6.

The First Chinese Office Action dated Dec. 17, 2019; Appln. No. 201710127574.9.

Second Chinese Office Action Application No. 201710127574.9; dated Jun. 2, 2020.

International Search Report dated Jan. 25, 2018; PCT/CN2017/109513.

* cited by examiner

METHOD AND DEVICE FOR CALCULATING POWER GENERATION OF WIND FARM

This application is a national stage of International Application No. PCT/CN2017/109513, filed on Nov. 06, 2017, which claims priority to Chinese Patent Application No. 201710127574.9, filed on Mar. 06, 2017. Both of the aforementioned applications are hereby incorporated by reference in their entireties.

FIELD

The present disclosure relates to the field of wind power, and particularly to a method and a device for calculating a power generation of a wind farm.

BACKGROUND

The construction scale, economic benefits and risk degree of a wind farm depend on the calculation of early power generation of the wind farm. The calculation of the power generation of the wind farm depends on the actual situation of the distribution of wind resources in regions and on the adaptability and accuracy of the calculation method of the power generation. The complex topography and meteorological conditions have brought huge errors to the simulation of the wind conditions of the wind farm, and to the unit selection and the calculation of the power generation based on the simulation.

In view of this, there is a need for a power generation calculation method of the wind farm which can reduce the calculation error of the power generation of the wind farm thereby improving the accuracy of the calculation of the power generation of the wind farm.

SUMMARY

A method and a device for calculating a power generation of a wind farm are provided according to the application. With the method and the device, in a case where a terrain of a wind farm field is complex and anemometer tower data in the wind farm field is unrepresentative, a mesoscale numerical simulation of a meteorological variable in the wind farm field may be performed by using a mesoscale numerical model WRF (weather research and forecasting model), mesoscale numerical simulation data may be extracted as virtual anemometer tower data, and a calculation accuracy of the power generation of the wind farm may be improved by using the virtual anemometer tower data in calculating the power generation of the wind farm.

According to an aspect of the present application, a method for calculating a power generation of a wind farm is provided, which may include: determining whether a terrain complexity of a wind farm field exceeds a predetermined complexity; determining a representativeness of anemometer tower data in the wind farm field if the terrain complexity exceeds the predetermined complexity; performing a mesoscale numerical simulation of a meteorological variable of the wind farm field if the anemometer tower data is unrepresentative; extracting mesoscale numerical simulation data as virtual anemometer tower data; and calculating the power generation of the wind farm by using the virtual anemometer tower data.

According to another aspect of the present application, a device for calculating a power generation of a wind farm is provided, which may include: a terrain complexity determination unit, configured to determine whether a terrain complexity of a wind farm field exceeds a predetermined complexity; an anemometer tower data representativeness determination unit, configured to determine a representativeness of anemometer tower data in the wind farm field if the terrain complexity exceeds the predetermined complexity; a mesoscale numerical simulation unit, configured to perform a mesoscale numerical simulation of a meteorological variable of the wind farm field if the anemometer tower data is unrepresentative; a mesoscale numerical simulation data extraction unit, configured to extract mesoscale numerical simulation data as virtual anemometer tower data; a wind farm power generation calculation unit, configured to calculate the power generation of the wind farm by using the virtual anemometer tower data.

According to an aspect of the present application, a computer-readable medium is provided, where the computer-readable medium records a program for: determining whether a terrain complexity of a wind farm field exceeds a predetermined complexity; determining a representativeness of anemometer tower data in the wind farm field if the terrain complexity exceeds the predetermined complexity; performing a mesoscale numerical simulation of a meteorological variable of the wind farm field if the anemometer tower data is unrepresentative; extracting mesoscale numerical simulation data as virtual anemometer tower data; and calculating the power generation of the wind farm by using the virtual anemometer tower data.

According to another aspect of the present application, a device for calculating a power generation of a wind farm is provided, which includes: a memory, configured to save a program for: determining whether a terrain complexity of a wind farm field exceeds a predetermined complexity; determining a representativeness of anemometer tower data in the wind farm field if the terrain complexity exceeds the predetermined complexity; performing a mesoscale numerical simulation of a meteorological variable of the wind farm field if the anemometer tower data is unrepresentative; extracting mesoscale numerical simulation data as virtual anemometer tower data; and calculating the power generation of the wind farm by using the virtual anemometer tower data.

According to the method and the device, the present application may introduce virtual anemometer tower data through a mesoscale numerical simulation to improve a calculation accuracy of the power generation of the wind farm effectively, and may further improve the calculation accuracy of the power generation of the wind farm by performing a reliability verification and a correction of the mesoscale numerical simulation data, such that the calculation error of the power generation of the wind farm can be reduced even under a condition that the terrain is complex and the anemometer tower data is unrepresentative, to provide more accurate calculation result while installation and maintenance costs of the anemometer tower are saved.

BRIEF DESCRIPTION OF THE DRAWINGS

In order to more clearly illustrate the embodiments of the present application, the drawings used in the description of the embodiments will be briefly described below. However, the drawings in the following description only illustrate an embodiment of the present application, and other drawings may be obtained by those skilled in the art without any creative work.

DETAILED DESCRIPTION OF EMBODIMENTS

The technical solutions according to the embodiments of the present disclosure will be described clearly and completely as follows in conjunction with the drawings. Apparently, the described embodiments are only a few rather than all of embodiments of the present disclosure. Any other embodiments obtained by those skilled in the art based on the embodiments of the present disclosure without any creative work fall within the scope of the disclosure.

To facilitate understanding of the present application, some of the terms used in the present application and the knowledge associated with these terms are explained and illustrated herein. "Mesoscale numerical model" (also called "WRF model") is a new-generation open-source meteorological model jointly developed by U.S. research organizations such as the U.S. environmental prediction center and the U.S. national center for atmospheric research. The module group included in the WRF model can be used as the theoretical basis for the basic physical process. It can also simulate real-world weather scenarios. The WRF mode's horizontal resolution, vertical direction hierarchy, integration area, and various physical processes can all be adjusted according to user requirements, which is extremely convenient for use and is currently widely recognized and used worldwide. Correspondingly, "mesoscale numerical simulation" refers to the use of "WRF model" for numerical simulation. In the process of mesoscale numerical simulation of meteorological variables using the "WRF model", due to the lack of mode resolution, etc., the physical process of the subgrid scale cannot be well described by the model, and needs other physical process parameters such as radiation, boundary layer, and microphysics to improve the simulation results. The combination of different parameterization schemes has important influence on the accuracy of the numerical simulation.

Figure 1:
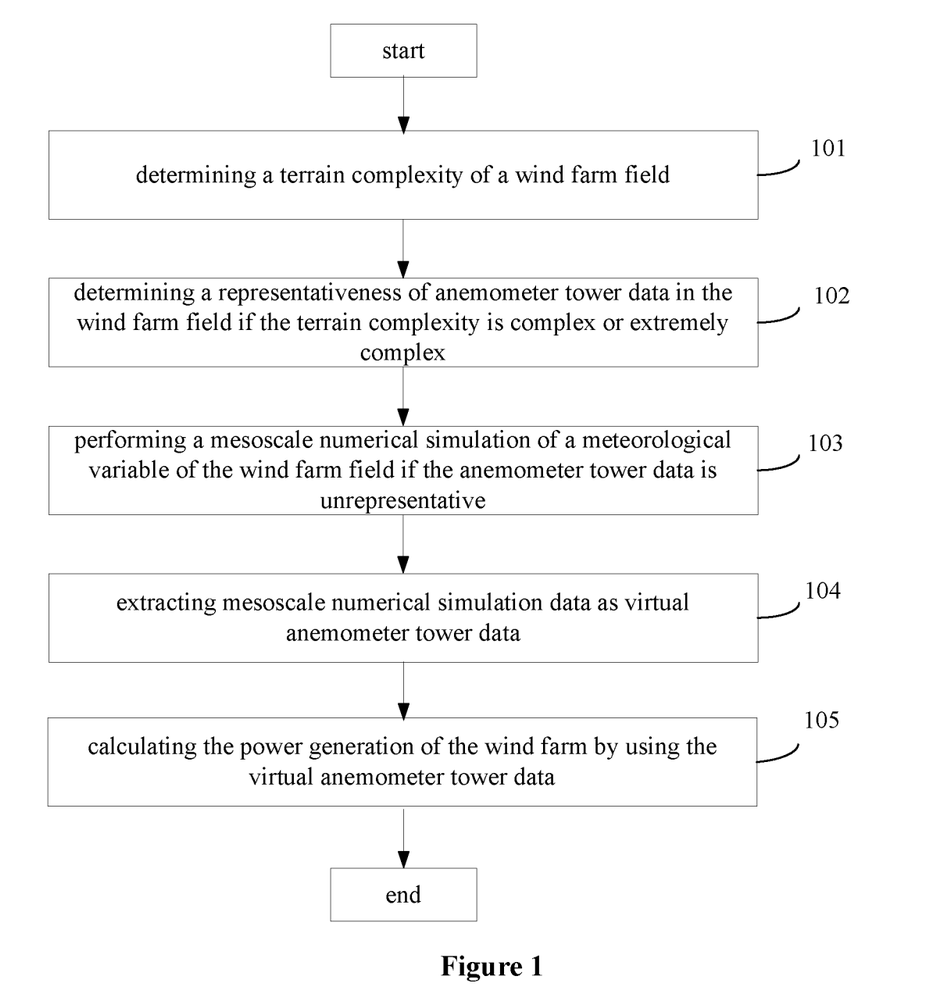
FIG. 1 is a flow chart showing a method for calculating a power generation of a wind farm according to an exemplary embodiment of the present application.

FIG. 1 is a flow chart showing a method for calculating a power generation of a wind farm according to an exemplary embodiment of the present application.

As shown in FIG. 1, in step 101, whether a terrain complexity of a wind farm field exceeds a predetermined complexity is determined. There are many ways to perform a flow field simulation of a wind farm, and a difference between the terrain complexities is one of the main reasons to adopt different simulation methods. For a flat and simple terrain, a linear airflow model (for example, WAsP) is often used to obtain satisfactory simulation results. For a complex mountain area, since the linear model overestimates an acceleration effect of the terrain, a three-dimensional flow simulation software (for example, WindSim, Meteodyn WT) is usually used to simulate the flow field; for an extremely complex mountain terrain, such as high mountains and deep valleys, almost no wind flow model can give satisfactory simulation results. Since the method for calculating a power generation of a wind farm according to the present application mainly aims at the complex terrain or the extremely complex terrain, in the method for calculating the power generation of the wind farm according to the exemplary embodiment of the present application, the terrain complexity of the wind farm field is determined firstly. In an embodiment, a ruggedness index (RIX) can be used to determine whether the terrain complexity of the wind farm field exceeds the predetermined complexity. The RIX can be calculated by the following methods: in a polar coordinate with R as a radius at a point, each radius line may intersect a contour line, and the intersection point divides the radius line into multiple line segments. The RIX value can be obtained by dividing the sum of the line segments, a topographic slope of which exceeds a critical slope θ, by the sum of the total line segments (i.e., the sum of the radius R). For a particular point, the RIX value of the point depends on three parameters: a calculation radius R, the critical slope θ and the number of radius line N. In an embodiment, the calculation radius R may be 3~5 km, the specific value can be determined based on a range of the wind farm field, the R may be 3.5 km by default, the critical slope θ is 0.3 rad (about 17°), the number N of radius line is 72. If RIX is equal to 0%, the topographic slope is less than 0.3 rad, and if RIX is greater than 0%, the slope in an field is greater than 0.3 rad.

According to the exemplary embodiment of the present application, if the ruggedness index is greater than or equal to a preset first ruggedness index, it is determined that the terrain complexity of the wind farm field exceeds the predetermined complexity. In an embodiment, if the ruggedness index is greater than or equal to the preset first ruggedness index, it may be determined that the terrain complexity is complex, if the ruggedness index is greater than or equal to a predetermined second ruggedness index, it may be determined that the terrain complexity is extremely complex, where the second ruggedness index is greater than the first ruggedness index. For example, the first ruggedness index may be 30%, and the second ruggedness index may be 50%. If the RIX is greater than 30%, it is determined that the terrain complexity is complex, and if the RIX is greater than 50%, it is determined that the terrain complexity is extremely complex. It may be understood that values of the first ruggedness index and the second ruggedness index are not limited to the above examples and proper determination threshold may be selected based on specific actual conditions and requirements. Since the simulation result of the extremely complex terrain may have a big deviation, special attentions are needed. Therefore, in an embodiment, the calculation method for calculating the power generation of the wind farm may further include: outputting a warning when it is determined that the terrain complexity of the wind farm field is extremely complex, to notify a computing staff to pay a special attention.

If it is determined that the terrain complexity exceeds the predetermined complexity in step S101, step S102 is performed, otherwise, the method ends. In step S102, a representativeness of anemometer tower data in the wind farm field is determined. The representativeness of the anemometer tower data is used for measuring whether the anemometer tower data is able to represent a local climate of the wind farm field. According the exemplary embodiment of the present application, the representativeness of the anemometer tower data may be determined based on an anemometer tower density, an altitude similarity or a terrain and landform similarity in the wind farm field. In an embodiment, in a region with the complex terrain or the extremely complex terrain, if the anemometer tower density is high enough, altitudes has a small difference within a jurisdiction of each anemometer tower, and a terrain roughness difference is small, the anemometer tower data is representative, otherwise, the anemometer tower data is unrepresentative. That is, the anemometer tower data is unrepresentative and is not sufficient to represent the local climate of the wind farm field.

According to the exemplary embodiment, the representativeness of the anemometer tower data may be determined through the anemometer tower density in the wind farm field. The anemometer tower density may be characterized by a ratio between a length of a diagonal line of the wind farm field and the number of the anemometer towers in the wind farm field. If the anemometer tower density is less than the predetermined density, circles are made with each anemometer tower as a center and the predetermined density as a diameter. If a proportion between a sum of areas of all circles (an overlapping area of all circles is added into the sum of areas of all circles only once when the sum of areas of all circles is calculated.) and the area of the wind farm field is greater than a predetermined proportion, the anemometer tower data is determined as representative data, otherwise, the anemometer tower data is determined as unrepresentative data. A region not covered by the circles is determined as a region where the anemometer tower data is unrepresentative. According to the exemplary embodiment, the predetermined density may be 3 kilometers, and the predetermined proportion may be 80%, which are not limited in the present application, and an easier or stricter determination threshold may be chosen as needed.

In an embodiment, the representativeness of the anemometer tower data may be determined based on an altitude similarity. If a difference between the highest altitude and the lowest altitude within the jurisdiction of each anemometer tower is less than a predetermined altitude difference, the altitudes within the jurisdiction has a similarity and the anemometer tower data is determined as representative data, otherwise, the anemometer tower data is determined as unrepresentative data and the jurisdiction of the anemometer tower is determined as the region where the anemometer tower data is unrepresentative. According to the exemplary embodiment of the present application, the jurisdiction of each anemometer tower may be represented as a circle with the anemometer tower as a center and a half distance between two adjacent anemometer towers as a radius. It may be understood that the definition of the jurisdiction of each anemometer tower is only illustrative and other methods may be used to define the jurisdiction of the anemometer towers. For example, the jurisdiction of each anemometer tower may be represented as a square with the anemometer tower as the center and a distance between two adjacent anemometer towers as a side length. According to the exemplary embodiment, the predetermined altitude difference may be 150 meters, which is not limited herein. For example, the predetermined altitude difference may be smaller than or greater than 150 meters.

Furthermore, in an embodiment, the representativeness of the anemometer tower data may be determined based on the terrain and landform similarity. If the difference between a maximum terrain roughness and a minimum terrain roughness within the jurisdiction of each anemometer tower is less than the predetermined roughness difference, the terrain and landform within the jurisdiction have a similarity and the anemometer tower data is determined as representative data, otherwise, the anemometer tower data is determined as unrepresentative data and the jurisdiction of the anemometer tower is determined as the region where the anemometer tower data is unrepresentative. In an embodiment, the predetermined roughness difference may be 0.1, or a value smaller than 0.1 or greater than 0.1 may be selected as needed.

If the anemometer tower data is determined as unrepresentative data in step S102, step S103 is performed, otherwise, if the anemometer tower data is representative, the method according to the conventional technology is directly adopted to calculate the power generation of the wind farm with the anemometer tower data. In step S103, a mesoscale numerical stimulation of meteorological variables of the wind farm field is performed. As a supplement of the anemometer tower data, a simulation precision of the mesoscale data is required to reach a high level, otherwise, new deviations may be introduced by the mesoscale simulation whose simulation effect does not reach the requirement, so as to cause a greater deviation when calculating the power generation. According to the exemplary embodiment, in order to improve the precision of the mesoscale numerical simulation data and the calculation accuracy of the power generation of the wind farm, a corresponding combination of parameterization schemes may be selected based on terrain characteristics, climate characteristics and/or historical simulation results of the region where the wind farm is located to perform the mesoscale numerical stimulation of meteorological variables of the wind farm field. The meteorological variables may include at least one of wind speed, wind direction, temperature, humidity, turbulence and air pressure. As described above, in the process of using "WRF mode" to perform the mesoscale numerical simulation of the meteorological variables, a difference of the combination of the parameterization schemes has an important influence on the precision of the numerical simulation. Therefore, in order to ensure a local adaptability of mesoscale simulation data, the proper combination of the parameterization schemes may be selected based on the terrain characteristics, the climate characteristics and/or the historical simulation results of the region where the wind farm is located to perform the mesoscale numerical stimulation of the wind speed, the wind direction and the multiple meteorological variables of the wind farm field.

For a proper parameterization scheme of a wind farm field, it is necessary to firstly consider the climate characteristics of the region where the wind farm field is located for the selection. In a region where the convection is active, a cumulus convection parameterization scheme is important; in a region with an intense boundary layer atmospheric activity, the planetary boundary layer parameterization scheme is important: in a region where the land and water distribution on earth surface has a big difference, a surface parameterization scheme is important; and microphysics, turbulence, diffusion, long wave radiation and short wave radiation are also important parameterization scheme options. There are so many parameterization options inside WRF, therefore, they are not repeated herein.

Taking a parameterization scheme of a boundary layer having a large impact on a surface wind speed as an example, YSU scheme is a first-order non-local closure scheme based on K diffusion mode, considering a heat exchange caused by an entrainment in a thermal inversion layer and a reverse gradient transport term in a turbulent diffusion equation; ACM2 scheme combines a vortex diffusion into the non-local diffusion scheme, which can describe the turbulent transport process of a super-grid scale and a sub-grid scale in the convection boundary layer; MYNN3 scheme is a turbulence kinetic energy parameterization scheme that predicts a turbulent kinetic energy and other secondary flux which is incorporated with a coagulation physical process and reduces a forecast deviation of a fog formation time and a fog dissipation time; MYJ turbulence kinetic energy scheme is a nonsingular scheme for turbulent parameterization in planetary boundary layer and free atmosphere, where an upper limit of the main length scale is derived from a condition that the disturbance kinetic energy production term is nonsingular under the condition of a turbulent growth, and depends on a shear of turbulent kinetic energy, buoyancy and driving current. In a wind farm, for example, with the above four different boundary layer parameterization schemes, the simulation effect of the surface layer wind speed is different, and an evaluation effect according to the measured data of the wind farm is MYNN3>YSU>ACM2>MYJ.

According to the principle of selecting the above parameterization schemes, and combined with the historical simulation experience of the region, the different combinations of the parameterization schemes are adopted to perform the simulation for the wind farms in different regions. Furthermore, this application focus on calculation of the power generation for the case that the terrain is complex and the anemometer tower data is unrepresentative, therefore, according to the exemplary embodiment of the present application, a model resolution of the mesoscale numerical simulation of the meteorological variables of the wind farm field should not be less than a predetermined resolution. For example, in the region where the terrain is complex or extremely complex, the predetermined resolution is preferably 3 kilometers or 1 kilometers, thereby ensuring that the anemometer tower data in the wind farm field is representative after the mesoscale numerical simulation data is determined as the supplementary virtual anemometer tower data.

After the mesoscale numerical simulation of the meteorological variables of the wind farm field is performed in step S103, the mesoscale numerical simulation data is extracted as the virtual anemometer tower data in step 104. In actual conditions, the wind farm field may be or may not be provided with the anemometer tower. Based on the exemplary embodiment of the present application, if the wind farm field is provided with the anemometer tower, the mesoscale numerical simulation data of the region where the anemometer tower data is unrepresentative in the wind farm field may be used as the supplementary virtual anemometer tower data of the region. If the wind farm field is not provided with the anemometer tower, the mesoscale numerical simulation data of the wind farm field may be used as the virtual anemometer tower data of the wind farm field.

After the virtual anemometer tower data is acquired, in step S105, the power generation of the wind farm is calculated by using the virtual anemometer tower data. In an embodiment, if the wind farm field is provided with the anemometer tower, the power generation of the wind farm is calculated by combining measured data of the anemometer tower in the wind farm field and the virtual anemometer tower data supplemented in step S103. If the wind faun field is not provided with the anemometer tower, the virtual anemometer tower data acquired in step S103 may be directly used to calculate the power generation of the wind farm. Based on the exemplary embodiment, after the mesoscale numerical simulation data is extracted as the virtual anemometer tower data, the representativeness of all anemometer tower data including the virtual anemometer tower data in the wind farm field may be determined again, if that the anemometer tower data is determined as representative data, step S105 of calculating the power generation of the wind farm by using the virtual anemometer tower data is performed.

In an embodiment, in step S105, at least one of WT, WindSim, WAsP and WindPro software can be used as a calculation tool to calculate the power generation of the wind farm. If the wind farm field is provided with the anemometer tower, the measured data of the anemometer tower and the supplemented virtual anemometer tower data are inputted into the at least one of WT, WindSim, WAsP and WindPro software to calculate the power generation of the wind farm. If the wind farm field is not provided with the anemometer tower, the acquired virtual anemometer tower data is directly inputted into the at least one of WT, WindSim, WAsP and WindPro software to calculate the power generation of the wind farm.

In an embodiment, through the above software, a corresponding relation between all points in the wind farm and wind acceleration factors of point positions of the anemometer towers may be firstly acquired based on differences of the terrains and the local climate in the wind farm region and according to linear or nonlinear relations. Combined with the positive and inverse relation between wind speed, the turbulence and the wind acceleration factor, the wind speed, turbulence and other parameters of all points in the wind farm are derived based on the actual wind speed, the actual wind direction, the actual turbulence and other parameters at the anemometer towers. Then, a machine type suitable to the wind condition is selected based on the wind speed, the turbulence and other parameters, and combined with an actual power curve of the machine type and the wind speed at the wind turbine point, the power generation of all wind generator in the wind farm is calculated and acquired, thereby acquiring the power generation of the whole wind farm.

Since the virtual anemometer towers may solve the problem of insufficient quantity of the anemometer towers in the wind farm, the virtual anemometer tower data and the measured data of the anemometer towers are combined to more accurately calculate the power generation of the wind farm. Referring to the method for calculating the power generation of the wind farm in FIG. 1, the virtual anemometer tower data is introduced by performing the mesoscale numerical simulation of the meteorological variables of the wind farm field, thereby improving the calculation accuracy of the power generation of the wind farm in the case of the terrain complexity exceeding the predetermined complexity and insufficient anemometer towers in the wind farm field.

Figure 2:
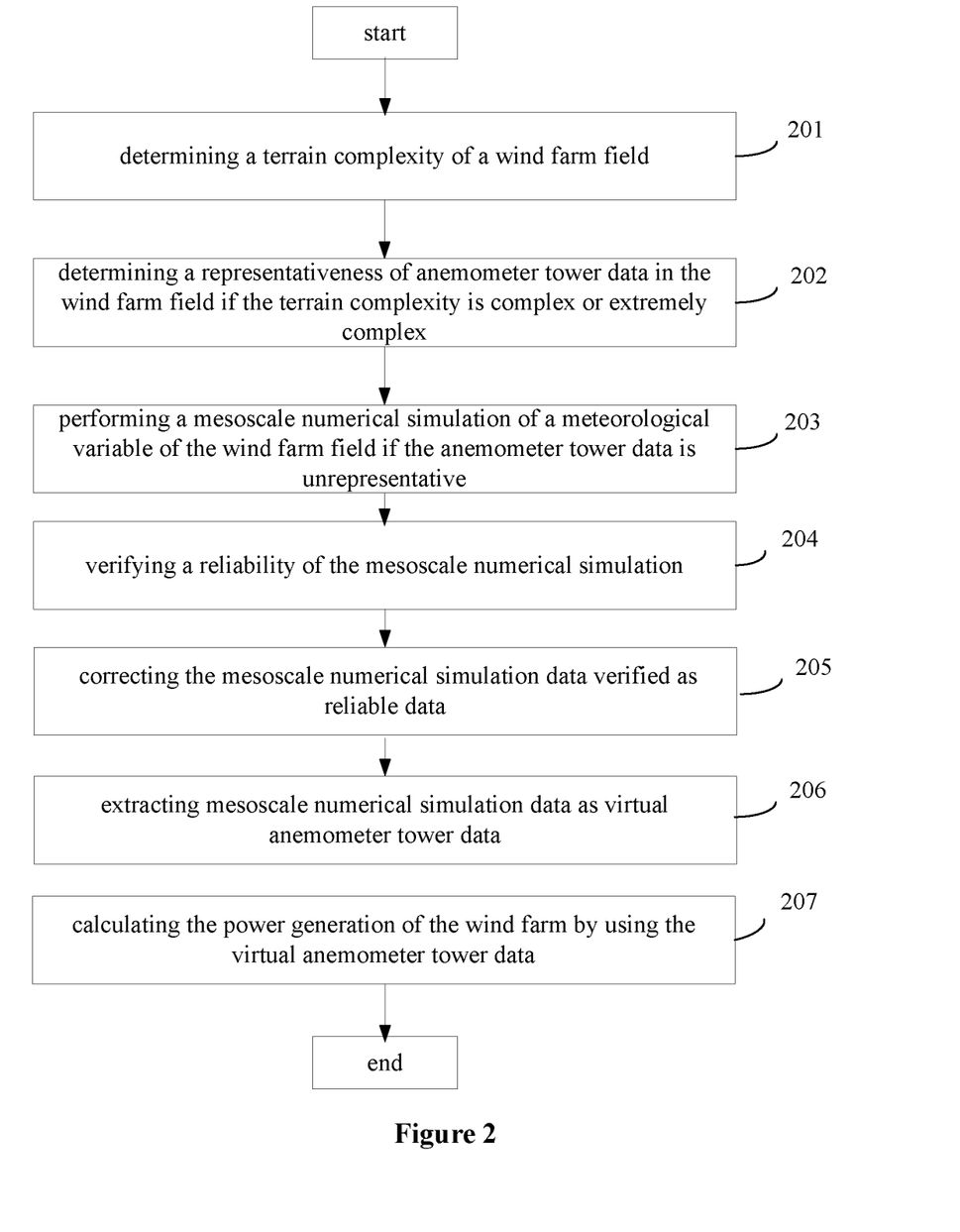
FIG. 2 is a flow chart showing a method for calculating a power generation of a wind farm according to another exemplary embodiment of the present application.

FIG. 2 is a flow chart showing a method for calculating a power generation of a wind farm according to another exemplary embodiment of the present application.

Steps 201, 202, and 203 in FIG. 2 are exactly the same as steps 101 to 103 in FIG. 1. Therefore, the description of steps 101 to 103 are also applicable to steps 201 to 203, which is not repeated herein. Different from the method for calculating the power generation of the wind farm shown in FIG. 1, in order to ensure that a simulation accuracy of the mesoscale numerical simulation data reaches a better level, steps for determining a reliability of the mesoscale numerical simulation data and correcting the mesoscale numerical simulation data are added after step 203 in the method for calculating the power generation of the wind farm according to another exemplary embodiment of the present application shown in FIG. 2 to ensure that the accuracy of the mesoscale numerical simulation data reaches the requirements, thereby improving the calculation accuracy of the power generation of the wind farm where the terrain is complex or extremely complex.

Hereinafter, steps 204 and 205 are described in detail. In step 204, the reliability of the mesoscale numerical simulation data is verified. Based on the exemplary embodiment, a correlation coefficient between existing anemometer tower data and the mesoscale numerical simulation data is used to verify the reliability of the mesoscale numerical simulation data. In an embodiment, if the wind farm field is provided with the anemometer tower, the measured data of the anemometer tower in the wind farm field may be used to verify the reliability of the mesoscale numerical simulation data. If the correlation coefficient between the measured data of the anemometer tower in the wind farm field and the mesoscale simulation data is greater than the predetermined correlation coefficient, the mesoscale numerical simulation data is verified as reliable data, otherwise, the mesoscale numerical simulation data is verified as unreliable data, and the mesoscale numerical simulation data simulated this time may be chosen to be removed and a model resolution of the mesoscale numerical simulation and the combination of parameterized schemes are reselected to perform the simulation again until that the mesoscale numerical simulation data is verified as reliable data. As another case, if the wind farm is not provided with the anemometer tower, the measured data of the anemometer tower in an adjacent wind farm field may be used to verify the reliability of the mesoscale numerical simulation data. In an embodiment, if the correlation coefficient between the measured data of the anemometer tower in the adjacent wind farm field and the mesoscale numerical simulation data of an adjacent region of the anemometer tower (in the mesoscale grid where the anemometer tower is located) is greater than the predetermined correlation coefficient, the mesoscale numerical simulation data is verified as reliable data. In an embodiment, the predetermined correlation coefficient may be 0.8, which is not limited thereto, a higher or lower predetermined correlation coefficient may be selected based on a requirement of a reliability standard of the mesoscale numerical simulation data. For example, if the wind farm field is provided with the anemometer tower, when the correlation coefficient between the measured wind speed of the anemometer tower and the simulated wind speed obtained by mesoscale numerical simulation is greater than 0.8, the mesoscale numerical simulation data is determined as reliable data. If the wind farm field is not provided with the anemometer tower, when the correlation coefficient between the measured wind speed of the anemometer towers in the adjacent field of the wind farm and the simulated wind speed in the adjacent region thereof is greater than 0.8, the mesoscale numerical simulation data is determined as reliable data.

In order to further ensure that the precision of the mesoscale numerical simulation data reaches the requirement and the calculation accuracy of the power generation of the wind farm is improved, in step 205, the mesoscale numerical simulation data verified as reliable data is corrected. In an embodiment, the mesoscale numerical simulation data verified as reliable data may be corrected through a statistical method by using the measured data or radar data of the anemometer towers in the wind farm or in an adjacent wind farm of the wind farm. Based on the exemplary embodiment, the radar data may be wind data measured and acquired by a laser radar or an acoustic radar. For example, the mesoscale numerical simulation data verified as reliable data may be corrected by using a multifactor regression statistical method, first, it is necessary to select an influential factor having a good correlation with the measured wind speed in the mesoscale numerical simulation data (for example, the temperature, the humidity, the pressure and the like.); second, a regression equation of the measured wind speed and the influence factor is established based on the influential factor, where the correction relation of the single point may be extended to the whole wind farm field based on the regression equation, such that the mesoscale numerical simulation data of the whole wind farm field may be corrected. For example, a neural network or a support vector machine and other machine learning algorithms may further be used to correct the mesoscale numerical simulation data, the relation between the influential factor and the actual wind speed may be worked out based on these algorithm models, generally the relation is a non-linear relation, and then the mesoscale numerical simulation data is corrected based on the relation. It should be understood that only an example of the statistical method for correcting the mesoscale numerical simulation data is provided herein and the statistical method for correcting the mesoscale numerical simulation data provided according to the present application is not limited thereto.

Steps 206 and 207 correspond to steps 104 and 105 in FIG. 1 respectively, therefore, the description is not repeated herein. A difference is that step 205 is performed after the mesoscale numerical simulation data is verified as reliable data and is corrected, and the operation of verifying and correcting the mesoscale numerical simulation data is not performed before step 104. Besides, the description of other contents in FIG. 1 also applies to FIG. 2, and for convenience, the description is not repeated herein.

Referring to the method for calculating the power generation of the wind farm shown in FIG. 2, since the reliability of the mesoscale numerical simulation data is further verified and the mesoscale numerical simulation data is further corrected on the basis of the method for calculating the power generation of the wind farm shown in FIG. 1, therefore, the precision of the mesoscale numerical simulation data may be further improved, thereby improving the calculation accuracy of the power generation of the wind farm.

Hereinafter, referring to FIGS. 3 and 4, a device for calculating a power generation of a wind farm according to the exemplary embodiment is described.

Figure 3:
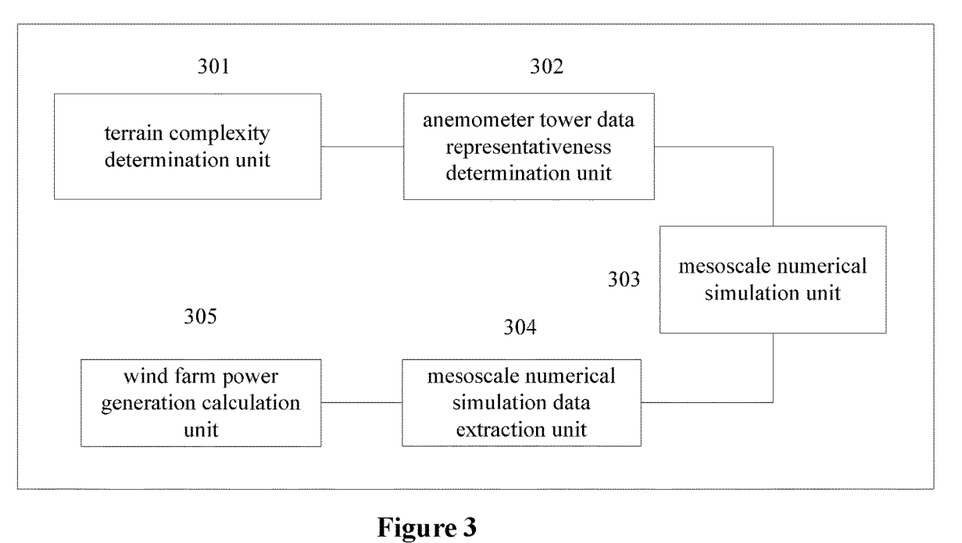
FIG. 3 is a block diagram showing a device for calculating a power generation of a wind farm according to an exemplary embodiment of the present application.

FIG. 3 is a block diagram showing a device for calculating a power generation of a wind farm 300 according to an exemplary embodiment of the present application.

Reference is made to FIG. 3, the device 300 may include a terrain complexity determination unit 301, an anemometer tower data representativeness determination unit 302, a mesoscale numerical simulation unit 303, a mesoscale numerical simulation data extraction unit 304 and a wind farm power generation calculation unit 305. The terrain complexity determination unit 301 may determine whether a terrain complexity of a wind farm field exceeds a predetermined complexity. The anemometer tower data representativeness determination unit 302 may determine a representativeness of anemometer tower data in the wind farm field if the terrain complexity of the wind farm field exceeds the predetermined complexity. The mesoscale numerical simulation unit 303 may perform the mesoscale numerical simulation of meteorological variables of the wind farm field if the anemometer tower data is uprepresentative. The mesoscale numerical simulation data extraction unit 304 may extract the mesoscale numerical simulation data as virtual anemometer tower data. The wind farm power generation calculation unit 305 may calculate the power generation of the wind farm by using the virtual anemometer tower data.

Hereinafter, the above units shown in FIG. 3 are described in more detail. Based on the exemplary embodiment, the terrain complexity determination unit 301 may use a ruggedness index to determine whether the terrain complexity of the wind farm field exceeds the predetermined complexity. If the ruggedness index is greater than or equal to a first ruggedness index, it is determined that the terrain complexity of the wind farm field exceeds the predetermined complexity. In an embodiment, if the ruggedness index is greater than or equal to a predetermined first ruggedness index, the terrain complexity determination unit 301 determines that the terrain complexity is complex; if the ruggedness index is greater than or equal to a predetermined second ruggedness index, the terrain complexity determination unit 301 determines that the terrain complexity is extremely complex, where the second ruggedness index is greater than the first ruggedness index. The operation performed by terrain complexity determination unit 301 corresponds to step 101 shown in FIG. 1, therefore, the related description of step 101 is also applicable to the terrain complexity determination unit 301, which is not repeated herein.

Based on the exemplary embodiment, the anemometer tower data representativeness determination unit 302 may determine the representativeness of the anemometer tower data through an anemometer tower density, an altitude similarity or a terrain and landform similarity in the wind farm field. When the anemometer tower data representativeness determination unit 302 determines the representativeness of the anemometer tower data through the anemometer tower density in the wind farm field, if the anemometer tower density is less than a predetermined density, circles are made with each anemometer tower as a center and a predetermined density as a diameter, if an proportion between a sum of areas of all circles and the area of the wind farm field is greater than a predetermined proportion, the anemometer tower data representativeness determination unit 302 may determine that the anemometer tower data is representative, otherwise, it is determined that the anemometer tower data is unrepresentative, and a region not covered by the circles is determined as the region where the anemometer tower data is unrepresentative. In an embodiment, the anemometer tower density may be characterized by a ratio between a length of a diagonal line of the wind farm field and a quantity of the anemometer towers in the wind farm field, but not limited thereto. When the anemometer tower data representativeness determination unit 302 determines the representativeness of the anemometer tower data based on the altitude similarity, if a difference between a highest altitude and a lowest altitude within a jurisdiction of each anemometer tower is less than a predetermined altitude difference, the altitudes within the jurisdiction has a similarity and the anemometer tower data representativeness determination unit 302 may determine that the anemometer tower data is representative, otherwise, the anemometer tower data is determined as unrepresentative data and the jurisdiction of the anemometer tower is determined as the region where the anemometer tower data is unrepresentative. When the anemometer tower data representativeness determination unit 302 determines the representativeness of the anemometer tower data through the terrain and landform similarity, if the difference between a maximum terrain roughness and a minimum terrain roughness within the jurisdiction of each anemometer tower is less than a predetermined roughness difference, the terrain and landform within the jurisdiction has a similarity and the anemometer tower data representativeness determination unit 302 may determine that the anemometer tower data is representative, otherwise, the anemometer tower data is determined as unrepresentative data and the jurisdiction of the anemometer tower is determined as the region where the anemometer tower data is unrepresentative. The operation performed by the anemometer tower data representativeness determination unit 302 corresponds to step 102 shown in FIG. 1 and the related description of step 102 (for example, descriptions of the jurisdiction, the predetermined proportion, the predetermined density, the predetermined altitude difference, and the predetermined roughness difference) is also applicable to the anemometer tower data representativeness determination unit 302, therefore, the description is not repeated herein.

The mesoscale numerical simulation unit 303 may select a corresponding combination of parameterization schemes based on terrain characteristics, climate characteristics and/or historical simulation results of the region where the wind farm is located to perform the mesoscale numerical stimulation of the meteorological variables of the wind farm field. The meteorological variables may include at least one of wind speed, wind direction, temperature, humidity, turbulence and air pressure, but not limited thereto. The present application calculates the power generation of the wind farm for the wind farm field where the terrain is complex or the terrain is extremely complex, therefore, a model resolution of performing the mesoscale numerical simulation of the meteorological variables of the wind farm field by the mesoscale numerical simulation unit 303 is preferably not less than a predetermined resolution, which is suitable for 3 kilometers or 1 kilometer. The operation performed by the mesoscale numerical simulation unit 303 corresponds to step 103 shown in FIG. 1 and the related description of step 103 (for example, a related description of the parameterized scheme) is also applicable to the mesoscale numerical simulation unit 303, which is not repeated herein.

After the mesoscale numerical simulation of the meteorological variables of the wind farm field is performed by the mesoscale numerical simulation unit 303, the mesoscale numerical simulation data extraction unit 304 may extract the mesoscale numerical simulation data as the virtual anemometer tower data. Based on the exemplary embodiment, if the wind farm field is provided with the anemometer tower, the mesoscale numerical simulation data extraction unit 304 may determine the mesoscale numerical simulation data of the region where the anemometer tower data is unrepresentative in the wind farm field as the supplementary virtual anemometer tower data of the region. If the wind farm field is not provided with the anemometer tower, the mesoscale numerical simulation data extraction unit 304 may determine the mesoscale numerical simulation data of the wind farm field as the virtual anemometer tower data of the wind farm field. The operation performed by the mesoscale numerical simulation data extraction unit 304 corresponds to step 104 shown in FIG. 1 and the related description of step 104 is also applicable to the mesoscale numerical simulation data extraction unit 304, which is not repeated herein.

After the virtual anemometer tower data is acquired, the wind farm power generation calculation unit 305 may calculate the power generation of the wind farm by using the virtual anemometer tower data. In an embodiment, if the wind farm field is provided with the anemometer tower, the power generation of the wind farm is calculated by combining measured data of the anemometer tower in the wind farm field and the supplementary virtual anemometer tower data. If the wind farm is not provided with the anemometer tower, the virtual anemometer tower data may be directly used to calculate the power generation of the wind farm. Based on the exemplary embodiment, after the mesoscale numerical simulation data is extracted as the virtual anemometer tower data, the anemometer tower data representativeness determination unit 302 may determine the representativeness of all anemometer tower data including the virtual anemometer tower data. If the anemometer tower data is determined as representative data, the wind farm power generation calculation unit 305 calculates the power generation of the wind farm by using the virtual anemometer tower data. For example, at least one of WT, WindSim, WAsP and WindPro can be used by the wind farm power generation calculation unit 305 as a calculation tool to calculate the power generation of the wind farm. The operation performed by the wind farm power generation calculation unit 305 corresponds to step 105 shown in FIG. 1, therefore, the related description of step 105 is also applicable to the wind farm power generation calculation unit 305. which is not repeated herein.

Referring to the device for calculating the power generation of the wind farm introduces the virtual anemometer tower data through performing the mesoscale numerical simulation of the meteorological variables of the wind farm field shown in FIG. 3, the calculation accuracy of the power generation of the wind farm may be improved in the case of the terrain being complex or extremely complex and insufficient anemometer towers in the wind farm field.

Figure 4:
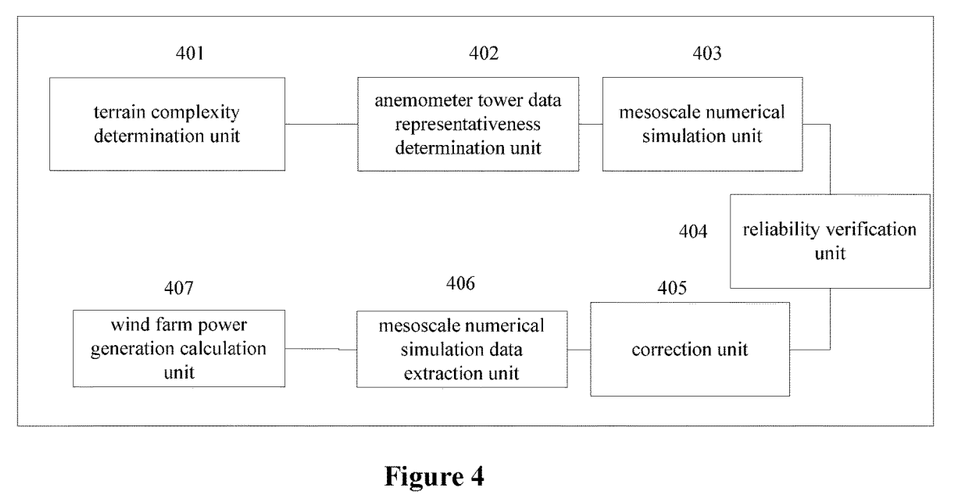
FIG. 4 is a schematic block diagram showing a device for calculating a power generation of a wind farm according to another exemplary embodiment of the present application.

FIG. 4 is a schematic block diagram showing a device for calculating a power generation of a wind farm 400 according to another exemplary embodiment of the present application.

As shown in FIG. 4, the device 400 may include a terrain complexity determination unit 401, an anemometer tower data representativeness determination unit 402, a mesoscale numerical simulation unit 403, a reliability verification unit 404, a correction unit 405, a mesoscale numerical simulation data extraction unit 406 and a wind farm power generation calculation unit 407. The terrain complexity determination unit 401, the anemometer tower data representativeness determination unit 402, the mesoscale numerical simulation unit 403, the mesoscale numerical simulation data extraction unit 406 and the wind farm power generation calculation unit 407 are the same as the terrain complexity determination unit 301, the anemometer tower data representativeness determination unit 302, the mesoscale numerical simulation unit 303, the mesoscale numerical simulation data extraction unit 304 and the wind farm power generation calculation unit 305 described by referring to FIG. 3 respectively, therefore, the description is not repeated herein.

Different from the device for calculating the power generation of the wind farm shown in FIG. 3, the reliability verification unit 404 and the correction unit 405 are added to the device 400 based on the device 300 to ensure that the precision of the mesoscale numerical simulation data reaches the requirements, thereby further improving the calculation accuracy of the power generation of the wind farm in the case of the terrain being complex or extremely complex. Hereinafter, the reliability verification unit 404 and the correction unit 405 are described in detail.

The reliability verification unit 404 may verify the reliability of the mesoscale numerical simulation data after the mesoscale numerical simulation unit 403 performs the mesoscale numerical simulation of the meteorological variables of the wind farm field. For example, the reliability verification unit 404 may verify the reliability of the mesoscale numerical simulation data through using a correlation coefficient between the existing anemometer tower data and the mesoscale numerical simulation data. if the wind farm field is provided with the anemometer tower, the reliability verification unit 404 may use the measured data of the anemometer tower in the wind farm field to verify the reliability of the mesoscale numerical simulation data. Herein, if the correlation coefficient between the measured data of the anemometer tower in the wind farm field and the mesoscale simulation data is greater than a predetermined correlation coefficient, the reliability verification unit 404 verifies that the mesoscale numerical simulation data is reliable. If the wind farm is not provided with the anemometer tower, the reliability verification unit 404 uses the measured data of the anemometer tower in an adjacent wind farm field to verify the reliability of the mesoscale numerical simulation data. If the correlation coefficient between the measured data of the anemometer tower in the adjacent wind farm field and the mesoscale numerical simulation data of an adjacent region of the anemometer tower is greater than the predetermined correlation coefficient, the reliability verification unit 404 verifies that the mesoscale numerical simulation data is reliable. Since the device 400 corresponds to the method for calculating the power generation of the wind farm shown in FIG. 2, the operation performed by the reliability verification unit 404 corresponds to step 204 shown in FIG. 2, therefore, the related description of step 204 is also applicable to the reliability verification unit 404, which is not repeated herein.

The correction unit 405 may correct the mesoscale numerical simulation data verified as reliable data. Based on the exemplary embodiments, the correction unit 405 may correct the mesoscale numerical simulation data verified as reliable data through a statistical method by using the measured data or radar data of the anemometer tower in the wind farm or in an adjacent wind farm of the wind farm. The operation performed by the correction unit 405 corresponds to step 205 shown in FIG. 2, therefore, the related description of step 205 (For example, the description of the statistical method and so on.) is also applicable to the correction unit 405, which is not repeated herein.

After the mesoscale numerical simulation data is verified as reliable data and is corrected, the mesoscale numerical simulation data extraction unit 406 and the wind farm power generation calculation unit 407 may perform the subsequent operation as described in FIG. 3.

Referring to the device for calculating the power generation of the wind farm shown in FIG. 4, since the reliability of the mesoscale numerical simulation data is verified and the mesoscale numerical simulation data is corrected, therefore, the precision of the mesoscale numerical simulation result may be further improved, thereby improving the calculation accuracy of the power generation of the wind farm.

The application has been described in detail in reference to attached FIGS. 1 to 4. As described above, according to the present application, the calculation accuracy of the power generation of the wind farm where the terrain is complex or extremely complex may be improved; for the wind farm with the insufficient anemometer towers, through supplementing the virtual anemometer tower, the calculation accuracy of the wind farm field may be improved and the cost of installing and maintaining the anemometer towers and the time of collecting the data are saved; even in the wind farm field without the anemometer tower, if the adjacent wind farm field has the measured data of the anemometer tower, the relatively reliable virtual anemometer tower data may still be obtained through the method of this application and the time length of installing the anemometer tower and collecting the data may still be reduced, meanwhile, the development of wind farm project is accelerated. Furthermore, when performing a mesoscale numerical simulation of multiple wind farm fields, the parameterized scheme experience of the numerical simulation in view of the different regions may be accumulated, which is helpful for the improvement of a forecast accuracy of the wind speed of the wind farm and the establishment of a mesoscale database in various regions. Furthermore, when correcting the mesoscale numerical simulation result of multiple wind farms, an influence factor library of different regions that has great correlation to the measured wind speed may be obtained, where the accumulation of the influence factor library is of great help to the calculation accuracy of the power generation of the wind farm.

It should be noted that the description of the above embodiments focuses on the differences with other embodiments; hence, for the same or similar parts between the various embodiments, one can refer to the other embodiments.

Furthermore, it should be noted that terms "include" or any other variations are intended to cover non-exclusive "include", so that a method or a device including a series of factors not only include the factors, but also include other factors not explicitly listed, or also include inherent factors of the method or the device. Without more limitation, a factor defined in a sentence "include one . . . " does not exclude a case that there is also another same factor in the process, the method, the object or the device including the described factor.

Besides, the components of the device used for calculating the power generation of the wind farm can be achieved as hardware components or software components, and can be combined as needed. In addition, those skilled in the art can implement each component based on the processing performed by the each component, such as a field programmable gate array (FPGA) or a special integrated circuit (ASIC).

The method for calculating the power generation of the wind farm can be recorded in a computer readable medium including the program instructions for performing various operations achieved by the computer. Examples of computer-readable medium include a magnetic medium (such as a hard disk, a floppy disk, and a tape); an optical medium (e.g. CD-ROM and DVD); a magneto-optical medium (for example, an optical disk); and the hardware devices that are specially prepared to store and execute program instructions (for example, ROM), a random access memory (RAM), a flash memory, etc.). Examples of program instructions include the machine code generated by the compiler and files containing advanced code that can be executed by the computer using the interpreter.

Although this application has been specifically shown and described in the exemplary embodiment of the application, but those skilled in the art should understand, various changes in the form and details may be made therein without departing from the spirit and scope of the present application as defined by the following claims.

The invention claimed is:
1. A method for calculating a power generation of a wind farm, comprising:
  performing a flow field simulation of the wind farm based on a terrain complexity difference;
  determining a ruggedness index of a wind farm field;
  determining that a terrain complexity of the wind farm field exceeds a predetermined complexity and outputting a warning, in response to determining that the ruggedness index of the wind farm field is greater than or equal to a preset first ruggedness index;
  determining whether anemometer tower data in the wind farm field is able to represent a local climate of the wind farm field, based on one of an anemometer tower density, an altitude similarity, and a terrain and landform similarity of the wind farm field, wherein the anemometer tower data is obtained by measuring a wind resource in the wind farm field by an anemometer tower arranged in the wind farm or in an adjacent wind farm;
  determining that the anemometer tower data in the wind farm field is unrepresentative, in response to determining that the anemometer tower data in the wind farm field is not able to represent the local climate of the wind farm field;
  performing a mesoscale numerical simulation of a meteorological variable of the wind farm field, to obtain mesoscale numerical simulation data, wherein the meteorological variable comprises at least one of wind speed, wind direction, temperature, humidity, turbulence and air pressure at the wind farm field, wherein the mesoscale numerical simulation is performed by using a mesoscale numerical model for numerical simulation, and each of a horizontal resolution, a vertical direction hierarchy and an integration area of the mesoscale numerical model is adjusted according to user requirements; determining the mesoscale numerical simulation data as virtual anemometer tower data; and
  calculating the power generation of the wind farm by using the virtual anemometer tower data.

2. The method according to claim 1, further comprising:
  verifying a reliability of the mesoscale numerical simulation data and correcting the mesoscale numerical simulation data verified as reliable data, after performing the mesoscale numerical simulation of the meteorological variable of the wind farm field,
  wherein the step of determining the mesoscale numerical simulation data comprises: determining corrected mesoscale numerical simulation data as the virtual anemometer tower data.

3. The method according to claim 1, wherein in a case of determining whether the anemometer tower data in the wind farm field is able to represent the local climate of the wind farm field based on the anemometer tower density,
  the anemometer tower density is represented by a ratio between a length of a diagonal line of the wind farm field and a quantity of an anemometer tower in the wind farm field,
  if the anemometer tower density is less than a predetermined value, a circle is formed with each anemometer tower as a center and the predetermined value as a diameter,
  if a proportion of a sum of areas of all circles to an area of the wind farm field is greater than a predetermined proportion, the anemometer tower data is determined as representative data, and if the proportion of the sum of areas of all circles to the area of the wind farm field is smaller than or equal to the predetermined proportion, the anemometer tower data is determined as unrepresentative data, a region not covered by the circles is determined as a region where the anemometer tower data is unrepresentative; or in a case of determining whether the anemometer tower data in the wind farm field is able to represent the local climate of the wind farm field based on the altitude similarity, if a difference between a highest altitude and a lowest altitude within a jurisdiction of each anemometer tower is less than a predetermined altitude difference, the altitudes within the jurisdiction has a similarity and the anemometer tower data is determined as representative data, and if the difference between the highest altitude and the lowest altitude within the jurisdiction of each anemometer tower is greater than or equal to the predetermined altitude difference, the anemometer tower data is determined as unrepresentative data and the jurisdiction of the anemometer tower is determined as the region where the anemometer tower data is unrepresentative; or in a case of determining whether the anemometer tower data in the wind farm field is able to represent the local climate of the wind farm field based on the terrain and landform similarity, if a difference between a maximum terrain roughness and a minimum terrain roughness within the jurisdiction of each anemometer tower is less than a predetermined roughness difference, the terrain and landform within the jurisdiction have a similarity and the anemometer tower data is determined as representative data, and if the difference between the maximum terrain roughness and the minimum terrain roughness within the jurisdiction of each anemometer tower is greater than or equal to the predetermined roughness difference, the anemometer tower data is determined as unrepresentative data and the jurisdiction of the anemometer tower is determined as the region where the anemometer tower data is unrepresentative.

4. The method according to claim 1, wherein the step of performing the mesoscale numerical simulation of the meteorological variable in the wind farm field comprises: selecting a combination of corresponding parameterization schemes based on a terrain characteristics, a climate characteristics and/or a historical simulation result of a region where the wind farm is located to perform the mesoscale numerical stimulation of the meteorological variable of the wind farm field.

5. The method according to claim 2, wherein the step of verifying the reliability of the mesoscale numerical simulation data comprises:

verifying the reliability of the mesoscale numerical simulation data through using a correlation coefficient between existing anemometer tower data and the mesoscale numerical simulation data; and the step of correcting the mesoscale numerical simulation data verified as reliable data comprise:

correcting the mesoscale numerical simulation data verified as reliable data through a statistical method by using the measured data or radar data of the anemometer tower in the wind farm or in an adjacent wind farm of the wind farm.

6. The method according to claim 5, wherein if the wind farm field is provided with the anemometer tower, measured data of the anemometer tower in the wind farm field is used to verify the reliability of the mesoscale numerical simulation data; if a correlation coefficient between the measured data of the anemometer tower in the wind farm field and the mesoscale simulation data is greater than a predetermined correlation coefficient, the mesoscale numerical simulation data is verified as reliable data;

if the wind farm field is not provided with the anemometer tower, measured data of an anemometer tower in an adjacent wind farm field is used to verify the reliability of the mesoscale numerical simulation data, wherein if a correlation coefficient between the measured data of the anemometer tower in the adjacent wind farm field and mesoscale numerical simulation data of an adjacent region of the anemometer tower is greater than the predetermined correlation coefficient, the mesoscale numerical simulation data is verified as reliable data.

7. The method according to claim 1, wherein if the wind farm field is provided with the anemometer tower, mesoscale numerical simulation data of a region where the anemometer tower data is unrepresentative in the wind farm field is used as supplementary virtual anemometer tower data of the region; and the step of calculating the power generation of the wind farm by using the virtual anemometer tower data comprises: calculating the power generation of the wind farm by combining measured data of the anemometer tower in the wind farm field and the supplementary virtual anemometer tower data.

8. The method according to claim 1, wherein if the wind farm field is not provided with the anemometer tower, the mesoscale numerical simulation data of the wind farm field is used as the virtual anemometer tower data of the wind farm field;

the step of calculating the power generation of the wind farm by using the virtual anemometer tower data comprises: calculating the power generation of the wind farm by directly using the virtual anemometer tower data.

9. The method according to claim 1, further comprising: determining the representativeness of all anemometer tower data comprising the virtual anemometer tower data after the mesoscale numerical simulation data is determined as the virtual anemometer tower data, wherein if the anemometer tower data is determined as representative data, the power generation of the wind farm is calculated by using the virtual anemometer tower data.

10. A device for calculating power generation of a wind farm, comprising:

a terrain complexity determination unit, configured to perform a flow field simulation of the wind farm based on a terrain complexity difference, determine a ruggedness index of a wind farm field, and determine that a terrain complexity of the wind farm field exceeds a predetermined complexity and output a warning in response to determining that the ruggedness index of the wind farm field greater than or equal to a preset first ruggedness index;

an anemometer tower data representativeness determination unit, configured to determine whether anemometer tower data in the wind farm field is able to represent a local climate of the wind farm field based on one of an anemometer tower density, an altitude similarity, and a terrain and landform similarity of the wind farm field, determine that the anemometer tower data in the wind farm field is unrepresentative in response to determining that anemometer tower data in the wind farm field is able to represent the local climate of the wind farm field, wherein the anemometer tower data is obtained by measuring a wind resource in the wind farm field by an anemometer tower arranged in the wind farm or in an adjacent wind farm;

a mesoscale numerical simulation unit, configured to perform a mesoscale numerical simulation of a meteorological variable of the wind farm field, to obtain mesoscale numerical simulation data, wherein the meteorological variable comprises at least one of wind speed, wind direction, temperature, humidity, turbulence and air pressure at the wind farm field, wherein the mesoscale numerical simulation is performed by using a mesoscale numerical model for numerical simulation, and each of a horizontal resolution, a vertical direction hierarchy and an integration area of the mesoscale numerical model is adjusted according to user requirements;

a virtual anemometer tower data determination unit, configured to determine the mesoscale numerical simulation data as virtual anemometer tower data;

a wind farm power generation calculation unit, configured to calculate the power generation of the wind farm by using the virtual anemometer tower data.

11. The device according to claim 10, comprising:

a reliability verification unit, configured to verify a reliability of the mesoscale numerical simulation data after the mesoscale numerical simulation unit performs the mesoscale numerical simulation of the meteorological variable of the wind farm field; and a correction unit, configured to correct the mesoscale numerical simulation data verified as reliable data, wherein the virtual anemometer tower data determination unit is configured to determine corrected mesoscale numerical simulation data as virtual anemometer tower data.

12. The device according to claim 10, wherein in a case that the anemometer tower data representativeness determination unit determines whether the anemometer tower data in the wind farm field is able to represent the local climate of the wind farm field based on the anemometer tower density, the anemometer tower density is represented by a ratio between a length of a diagonal line of the wind farm field and a quantity of an anemometer tower in the wind farm field, if the anemometer tower density is less than a predetermined value, a circle is formed with each anemometer tower as a center and with the predetermined value as a diameter, if a proportion of a sum of areas of all circle to an area of the wind farm field is greater than a predetermined proportion, the anemometer tower data is determined as representative data, and if the proportion of the sum of areas of all circles to the area of the wind farm field is smaller than or equal to the predetermined proportion, the anemometer tower data is determined as unrepresentative data, a region not covered by the circles is determined as a region where the anemometer tower data is unrepresentative; or in a case that the anemometer tower data representativeness determination unit determines whether the anemometer tower data in the wind farm field is able to represent the local climate of the wind farm field based on the altitude similarity, if a difference between a highest altitude and a lowest altitude within a jurisdiction of each anemometer tower is less than a predetermined altitude difference, the altitudes within the jurisdiction has a similarity and the anemometer tower data is determined as representative data, and if the difference between the highest altitude and the lowest altitude within the jurisdiction of each anemometer tower is greater than or equal to the predetermined altitude difference, the anemometer tower data is determined as unrepresentative data and the jurisdiction of the anemometer tower is determined as the region where the anemometer tower data is unrepresentative; or in a case that the anemometer tower data representativeness determination unit determines whether the anemometer tower data in the wind farm field is able to represent the local climate of the wind farm field based on the terrain and landform similarity, if a difference between a maximum terrain roughness and a minimum terrain roughness within the jurisdiction of each anemometer tower is less than a predetermined roughness difference, the terrain and landform within the jurisdiction has a similarity and the anemometer tower data is determined as representative data, and if the difference between the maximum terrain roughness and the minimum terrain roughness within the jurisdiction of each anemometer tower is greater than or equal to the predetermined roughness difference, the anemometer tower data is determined as unrepresentative data and the jurisdiction of the anemometer tower is determined as the region where the anemometer tower data is unrepresentative.

13. The device according to claim 10, wherein the mesoscale numerical simulation unit selects a combination of corresponding parameterization schemes based on terrain characteristics, a climate characteristics and/or a historical simulation result of a region where the wind farm is located to perform the mesoscale numerical stimulation of the meteorological variable of the wind farm field.

14. The device according to claim 11, wherein the reliability verification unit verifies the reliability of the mesoscale numerical simulation data through using a correlation coefficient between existing anemometer tower data and the mesoscale numerical simulation data, and the correction unit is configured to correct the mesoscale numerical simulation data verified as reliable data through a statistical method by using the measured data or radar data of the anemometer tower in the wind farm or in an adjacent wind farm of the wind farm.

15. The device according to claim 14, wherein if the wind farm field is provided with the anemometer tower, the reliability verification unit uses measured data of the anemometer tower in the wind farm field to verify the reliability of the mesoscale numerical simulation data; if a correlation coefficient between the measured data of the anemometer tower in the wind farm field and the mesoscale simulation data is greater than a predetermined correlation coefficient, the mesoscale numerical simulation data is verified as reliable data; and if the wind farm field is not provided with the anemometer tower, the reliability verification unit uses measured data of an anemometer tower in an adjacent wind farm field to verify the reliability of the mesoscale numerical simulation data, wherein if a correlation coefficient between the measured data of the anemometer tower in the adjacent wind farm field and mesoscale numerical simulation data of an adjacent region of the anemometer tower is greater than the predetermined correlation coefficient, the mesoscale numerical simulation data is verified as reliable data.

16. The device according to claim 10, wherein if the wind farm field is provided with the anemometer tower,
the virtual anemometer tower data determination unit uses mesoscale numerical simulation data of a region where the anemometer tower data is unrepresentative in the wind farm field as supplementary virtual anemometer tower data of the region; and
the wind farm power generation calculation unit calculates the power generation of the wind farm by combining measured data of the anemometer tower in the wind farm field and the supplementary virtual anemometer tower data.

17. The device according to claim 10, wherein if the wind farm field is not provided with the anemometer tower,
the virtual anemometer tower data determination unit uses the mesoscale numerical simulation data of the wind farm field as the virtual anemometer tower data of the wind farm field; and
the wind farm power generation calculation unit calculates the power generation of the wind farm by directly using the virtual anemometer tower data.

18. The device according to claim 10, wherein the anemometer tower data representativeness determination unit determines the representativeness of all anemometer tower data comprising the virtual anemometer tower data after the virtual anemometer tower data determination unit determines the mesoscale numerical simulation data as the virtual anemometer tower data, wherein if the anemometer tower data is determined as representative data, the wind farm power generation calculation unit calculates the power generation of the wind farm by using the virtual anemometer tower data.

19. A device for calculating a power generation of a wind farm, comprising:
a memory, configured to store a program for performing steps as:
performing a flow field simulation of the wind farm based on a terrain complexity difference,
determining a ruggedness index of a wind farm field,
determining that a terrain complexity of the wind farm field exceeds a predetermined complexity and outputting a warning, in response to determining that the ruggedness index of the wind farm field is greater than or equal to a preset first ruggedness index,
determining whether anemometer tower data in the wind farm field is able to represent a local climate of the wind farm field, based on one of an anemometer tower density, an altitude similarity, and a terrain and landform similarity of the wind farm field, wherein the anemometer tower data is obtained by measuring a wind resource in the wind farm field by an anemometer tower arranged in the wind farm or in an adjacent wind farm,
determining that the anemometer tower data in the wind farm field is unrepresentative, in response to determining that the anemometer tower data in the wind farm field is not able to represent the local climate of the wind farm field,
performing a mesoscale numerical simulation of a meteorological variable of the wind farm field, to obtain mesoscale numerical simulation data, wherein the meteorological variable comprises at least one of wind speed, wind direction, temperature, humidity, turbulence and air pressure at the wind farm field, wherein the mesoscale numerical simulation is performed by using a mesoscale numerical model for numerical simulation, and each of a horizontal resolution, a vertical direction hierarchy and an integration area of the mesoscale numerical model is adjusted according to user requirements,
determining the mesoscale numerical simulation data as virtual anemometer tower data, and
calculating the power generation of the wind farm by using the virtual anemometer tower data; and
a processor configured to perform the program.

* * * * *